(12) United States Patent
Carbonell et al.

(10) Patent No.: US 8,201,445 B2
(45) Date of Patent: *Jun. 19, 2012

(54) METHODS AND COMPOSITIONS FOR REMOVING RESIDUES AND SUBSTANCES FROM SUBSTRATES USING ENVIRONMENTALLY FRIENDLY SOLVENTS

(75) Inventors: Ruben G. Carbonell, Raleigh, NC (US); Peter Kilpatrick, Cary, NC (US); Nael Zaki, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/221,059

(22) Filed: Aug. 30, 2011

(65) Prior Publication Data

US 2011/0308305 A1 Dec. 22, 2011

Related U.S. Application Data

(63) Continuation of application No. 12/844,080, filed on Jul. 27, 2010, now Pat. No. 8,006,551, which is a continuation of application No. 12/336,045, filed on Dec. 16, 2008, now abandoned, which is a continuation of application No. 11/634,754, filed on Dec. 6, 2006, now Pat. No. 7,465,395, which is a continuation of application No. 10/374,119, filed on Feb. 25, 2003, now abandoned.

(60) Provisional application No. 60/359,935, filed on Feb. 27, 2002, provisional application No. 60/359,826, filed on Feb. 27, 2002, provisional application No. 60/359,976, filed on Feb. 27, 2002, provisional application No. 60/359,975, filed on Feb. 27, 2002.

(51) Int. Cl.
*G01G 9/00* (2006.01)
(52) U.S. Cl. ............ 73/152.01; 73/433; 73/863.21; 177/1; 134/40; 210/634
(58) Field of Classification Search .......... 210/634, 210/638, 639; 177/1; 73/152.01, 152.03, 73/433, 863.21; 134/10, 25.1, 26, 34, 40, 134/42; 208/188; 252/175; 436/60; 510/108, 510/109, 366
See application file for complete search history.

(56) References Cited

U.S. PATENT DOCUMENTS 2,360,862 A 10/1944 Morris et al.
(Continued)

FOREIGN PATENT DOCUMENTS

WO WO 01/74966 A1 10/2001

OTHER PUBLICATIONS

Communication pursuant to Article 94(3) EPC for Application No. EP 03 743 244.0-2014 dated Jan. 19, 2009.
(Continued)

*Primary Examiner* — Joseph Drodge
(74) *Attorney, Agent, or Firm* — Myers Bigel Sibley & Sajovec

(57) ABSTRACT

Environmentally friendly solvents used to dissolve or remove residues and/or substances from substrates wherein the residue and/or substance is contacted with a Generally Recognized As Safe solvent to dissolve the residue and/or substance in the solvent followed by the extraction of the residue and/or substance from the solvent such as by contact with carbon dioxide.

6 Claims, 11 Drawing Sheets

U.S. PATENT DOCUMENTS

Figure 1:
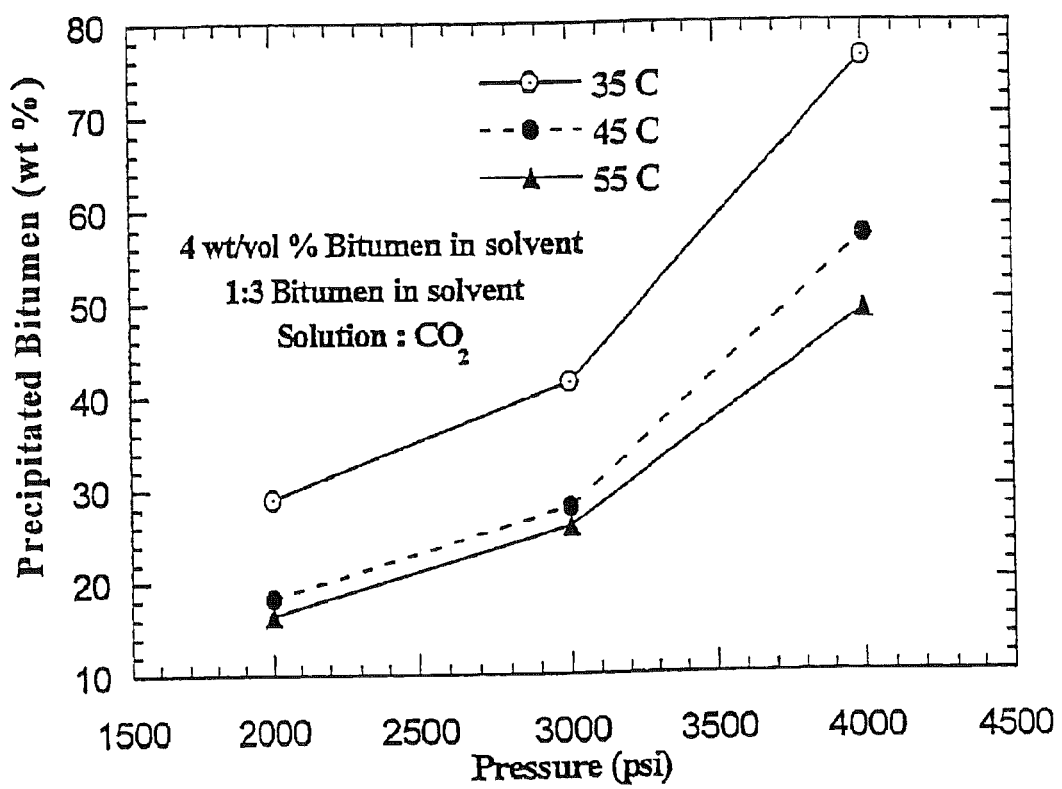

| | | | |
|---|---|---|---|
| 2,901,433 A | | 8/1959 | Spring |
| 3,368,876 A | | 2/1968 | Bailey, Jr. |
| 3,373,101 A | * | 3/1968 | Folkins et al. .................. 208/40 |
| 3,637,727 A | | 1/1972 | Fujmoto et al. |
| 3,795,277 A | | 3/1974 | Ban et al. |
| 4,382,853 A | | 5/1983 | McCoy |
| 4,824,570 A | | 4/1989 | Bethuel et al. |
| 4,863,525 A | | 9/1989 | Goel et al. |
| 5,611,869 A | | 3/1997 | Hart |
| 5,720,825 A | | 2/1998 | Kinnaird |
| 5,833,756 A | | 11/1998 | Haegel et al. |
| 5,866,005 A | | 2/1999 | DeSimone et al. |
| 5,944,996 A | | 8/1999 | DeSimone et al. |
| 5,993,660 A | | 11/1999 | Shook et al. |
| 5,993,975 A | | 11/1999 | Tanaka et al. |
| 6,033,996 A | | 3/2000 | Rath et al. |
| 6,096,699 A | | 8/2000 | Bergemann et al. |
| 6,117,197 A | | 9/2000 | Houser |
| 6,126,757 A | | 10/2000 | Kinnaird |
| 6,173,776 B1 | | 1/2001 | Furman et al. |
| 6,368,422 B1 | | 4/2002 | Breuer et al. |
| 6,402,952 B2 | | 6/2002 | McMurtrey et al. |
| 6,506,259 B1 | | 1/2003 | Romack et al. |
| 6,511,601 B2 | | 1/2003 | McMurtrey et al. |
| 6,702,903 B2 | | 3/2004 | Kawakami et al. |
| 6,858,090 B2 | * | 2/2005 | Hebert ........................... 134/13 |

OTHER PUBLICATIONS

Publication: "The missing organic molecules on Mars", Steven A. Brenner et al. published in PNAS, Mar. 14, 2000, vol. 97, No. 6, pp. 2425, downloaded from the Internet on Jan. 23, 2010.

Publication: Developments in High Performance, Environmentally Friendly Corrosion Inhibitors for the Oilfield, Mark Gough et al, published in Corrosion 99, NACE conference, Apr. 25-30, 1999, San Antonio, TX, downloaded from the Internet on Jan. 22, 2010.

Letter comprising Specification for U.S. Appl. No. 09/534,172 to Kawakami et al., Mar. 24, 2000.

* cited by examiner

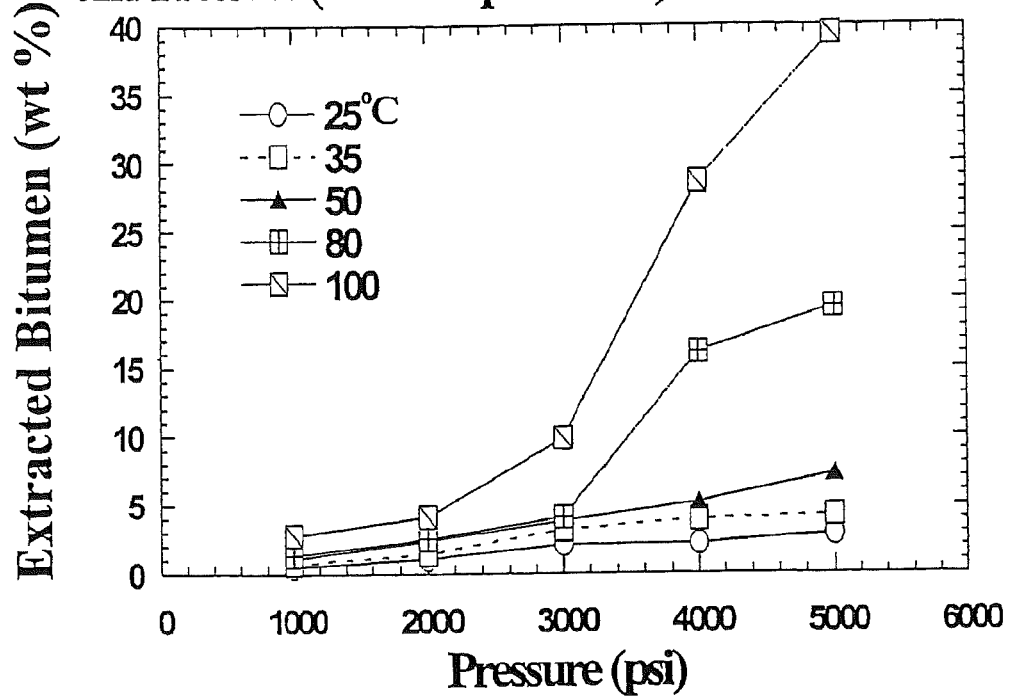
Figure 10. Bitumen Extraction as a Function of Temperature and Pressure (Batch Experiments) 1 hr Residence Time

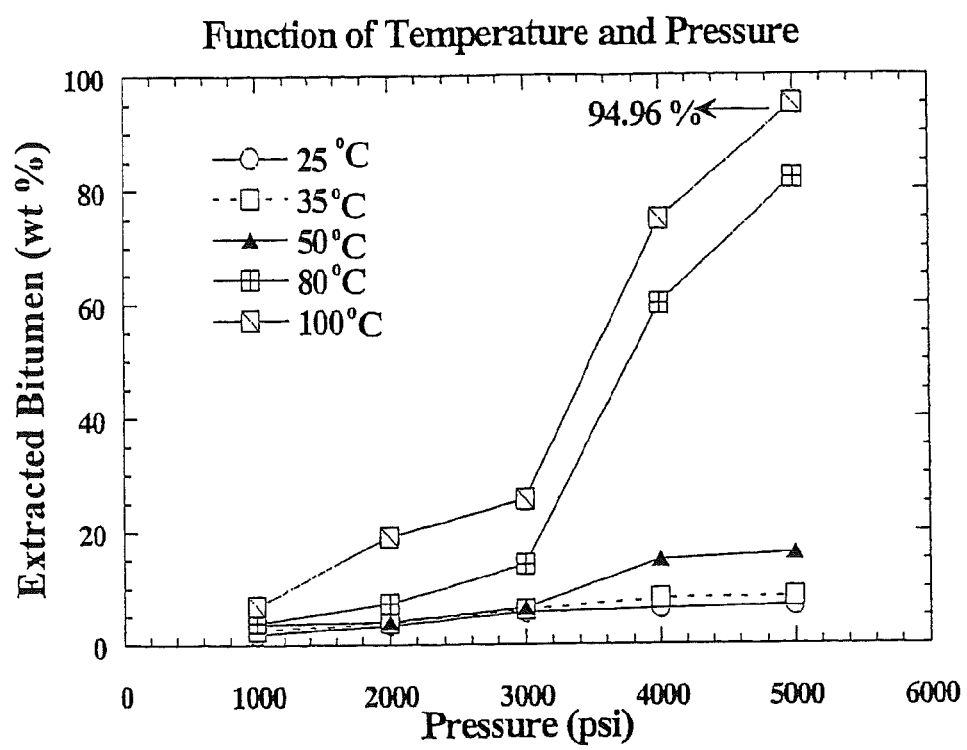
Figure 11. Multiple Batch Bitumen Extraction from Asphalt by $CO_2$ as a Function of Temperature and Pressure

METHODS AND COMPOSITIONS FOR REMOVING RESIDUES AND SUBSTANCES FROM SUBSTRATES USING ENVIRONMENTALLY FRIENDLY SOLVENTS

CROSS-REFERENCE TO RELATED APPLICATIONS

This application is a continuation of U.S. patent of U.S. application Ser. No. 12/844,080, filed on Jul. 27, 2010, now U.S. Pat. No. 8,006,551, which is a continuation of patent application Ser. No. 12/336,045, filed Dec. 16, 2008 now abandoned, which is a continuation of U.S. patent application Ser. No. 11/634,754, filed Dec. 6, 2006 now U.S. Pat. No. 7,465,395, which is a continuation of U.S. patent application Ser. No. 10/374,119, filed Feb. 25, 2003 (now abandoned), which claims the benefit of, and incorporates herein by reference in their entireties, the following U.S. Provisional Applications: U.S. Provisional Application No. 60/359,935, filed Feb. 27, 2002; U.S. Provisional Application No. 60/359,826, filed Feb. 27, 2002; U.S. Provisional Application No. 60/359,976, filed Feb. 27, 2002; and U.S. Provisional Application No. 60/359,975, filed Feb. 27, 2002.

FIELD OF THE INVENTION

This invention relates to methods and compositions for removing residues and substances from substrates and/or compounds.

BACKGROUND OF THE INVENTION

Various wanted and unwanted substances or residues may be removed from objects or substrates using various methods. For instance, chemical solvents may be used to remove unwanted residues from machinery, unwanted particles from products, or otherwise. Solvents may also be used to extract residues or substances from chemical compositions, products, or materials. For instance, a solvent may be used to separate a particular chemical compound from a mixture of chemical compounds. However, many of the solvents typically used by industry are not environmentally friendly. In fact, many of the solvents are hazardous materials and are expensive to use, maintain, control, and dispose of.

As one example, solvents are used to remove the build-up of solid and liquid petroleum residues and substances from substrates such as processing equipment. The build-up of oil residues such as asphalt and asphalt-related liquids (e.g., tar, pitch, and tack) on processing equipment utilized in petroleum and chemical processing, storage, and transport industries, as well as equipment used in highway and road construction, has long been problematic. After a certain level of build-up occurs, the equipment is often no longer capable of being used for its intended purpose. Accordingly, it is typically necessary to clean such equipment. Diesel fuel or a similar type of fuel has been used in the past for cleaning construction equipment. However, the use of these solvents has largely fallen into disfavor due to heightened environmental concerns. See e.g., Federal Water Pollution Control Act Amendments of 1972 (PL 92-500) Section 311(b)(1).

Another alternative is to employ organic solvents. Such solvents also pose potential environmental concerns. For instance, chlorinated solvents such as 1,1,1-trichloroethane or methylene chloride may be used to remove petroleum residues or substances from substrates. Moreover, notwithstanding any potential benefits associated therewith, these solvents are typically less than fully effective in removing petroleum residue. More specifically, these solvents are often not able to remove hard-to-dissolve petroleum residue fractions such as asphaltenes. Accordingly, these fractions are typically removed by employing labor-intensive efforts that are often time-consuming and expensive.

As another example, there is a current increasing interest in extracting wanted tar sand oil from its naturally occurring ores. Such ores are substantial underutilized sources of fossil fuels, particularly, for example, in Venezuela, Canada, and the United States. As crude oil reserves become relatively heavier, the need and consequent demand for recovering bitumen fractions from inorganic substrates (e.g., tar sands) increases.

Examples of methods currently employed in the extraction of tar sands involve the use of hot water, organic solvents, or petroleum distillates. During hot water extraction, emulsions are formed that are often difficult to break and to efficiently separate bitumen from water. These processes usually result in the generation of relatively high quantities of wastewater, termed "extraction tailings". Methods of wastewater treatment are often needed to allow a production site to attempt to comply with environmental regulations. Extractions with organic solvents or petroleum distillates often utilize materials of relatively high capital value to obtain bitumen of a lower capital value. Moreover, solvent extraction typically requires significant expenditures of equipment and energy to separate extracted bitumen from the organic solvent. As a result, it is extremely difficult on a commercial scale to employ extraction methods employing organic solvents.

The treatment and remediation of asphaltenic deposits occurring in different places in the production, refining, and transportation of crude oil is also desirous. Many crude oils are prone to form asphaltenic deposits. These deposits are detrimental to the productivity of the reservoir (as they clog the porosity of the pay zone), throughput of the pipeline, efficiency of the desalter and gas-liquid separator, and the storage capacity of a storage tank. Currently these asphaltenic deposits are either removed mechanically, or by employing expensive and environmentally irresponsible solvents.

Therefore, it is desirous to develop and use compositions and methods for removing residues or substances from substrates without the employment of expensive manual processes or expensive, and often environmentally hazardous, organic solvent extraction processes.

SUMMARY OF THE INVENTION

Embodiments of the present invention include compositions and methods for extracting or removing residues and/or substances from substrates. In certain embodiments, the residues and/or substances are removed from a substrate using an environmentally responsible solvent, for example, a Generally Recognized As Safe (also known as "GRAS") solvent. Preferably the GRAS solvent is miscible with carbon dioxide. Once removed, the residues or substances may be removed from a GRAS solvent, such as by contacting the GRAS solvent with carbon dioxide to separate any residue and/or substance from the GRAS solvent. For example, a petroleum residue may be removed from a substrate in the form of a tool by contacting the tool with a GRAS solvent composition, and the GRAS solvent composition could be separated from the dissolved or collected petroleum residue by contacting the GRAS solvent with carbon dioxide and precipitating the petroleum residue.

The methods and compositions of various embodiments of the present invention may be used to remove or dissolve petroleum-based residues or substances from substrates. In various embodiments, the invention comprises a method of removing petroleum residue from a substrate. The method comprises contacting the substrate with a solvent such that the petroleum residue separates from the substrate and is dissolved in the solvent. The solvent may include a GRAS solvent such as an ester-containing solvent. For example, a residue on a substrate may be separated from the substrate (e.g., a tool, tar sand, aqueous stream, etc.) by contacting the substrate with a benzoic acid ester-containing solvent such that the petroleum residue separates from the substrate and is dissolved in the benzoic acid ester-containing solvent. The solvent may be used to remove residues and/or substances from organic or inorganic substrates.

In other embodiments of the invention, the quantity of bitumen present in a petroleum residue sample may be determined using the compositions and methods of the present invention. A petroleum sample may be contacted with a GRAS solvent to remove bitumen from the sample. The weight of the bitumen extracted from the petroleum sample may be determined from weight measurements of the sample before and after being contacted with the GRAS solvent. Alternatively, the bitumen extracted by the GRAS solvent from the sample may be extracted from the GRAS solvent by contact with carbon dioxide and weighed or otherwise measured.

BRIEF DESCRIPTION OF THE DRAWING FIGURES

The invention can be more readily ascertained from the following description of the invention when read in conjunction with the accompanying drawings in which:

FIG. 1 compares precipitated bitumen (weight percent) versus pressure at different temperatures, and corresponds to Example 8.

Figure 2:
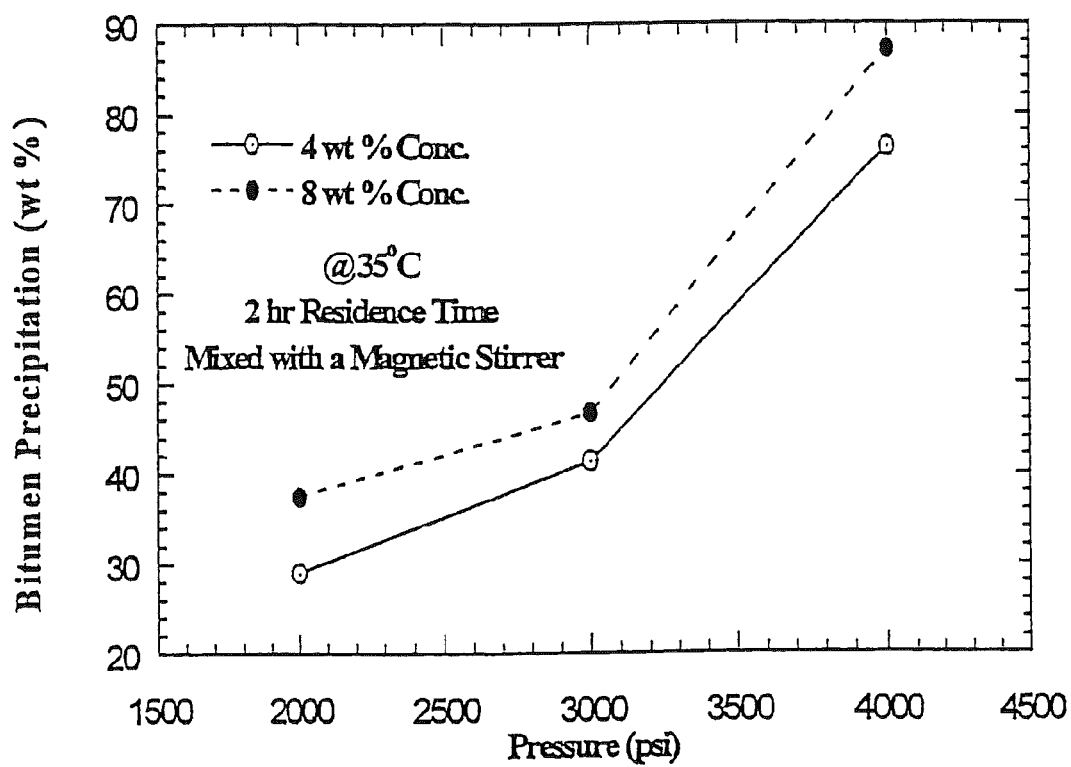

FIG. 2 compares precipitated bitumen (weight percent) versus preserve at different bitumen concentration, and corresponds to Example 9.

Figure 3:
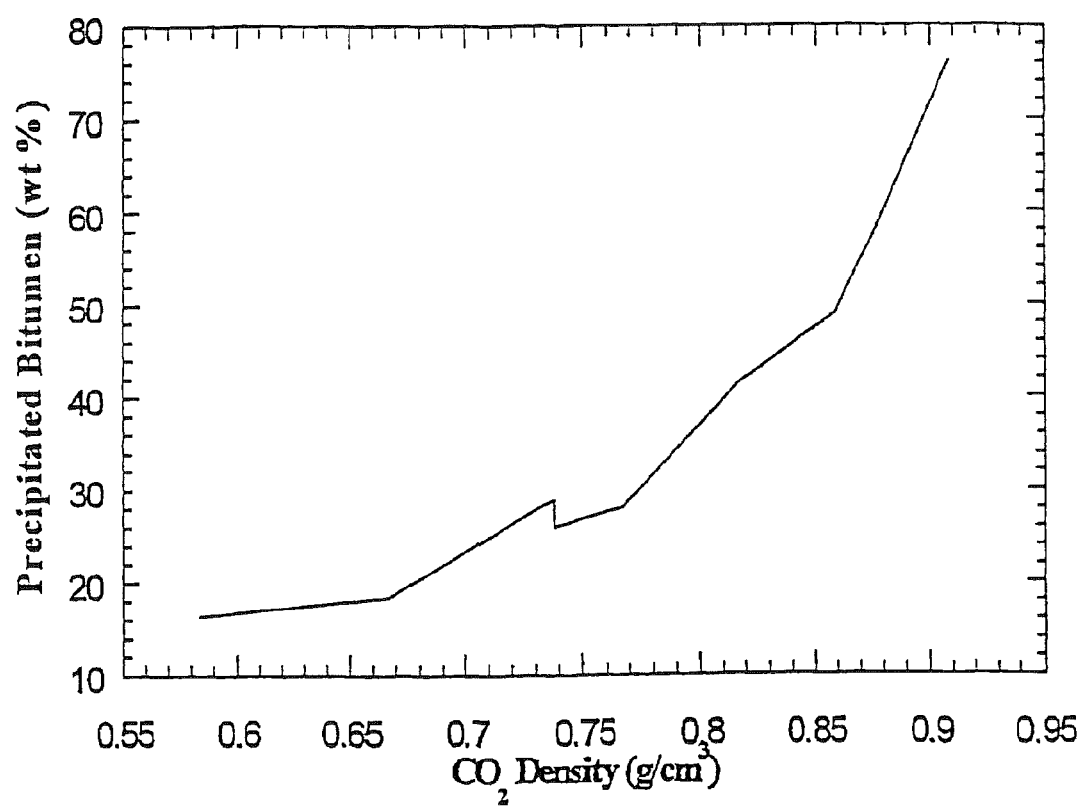

FIG. 3 compares precipitated bitumen (weight percent) versus carbon dioxide density, and corresponds to Example 10.

Figure 4:
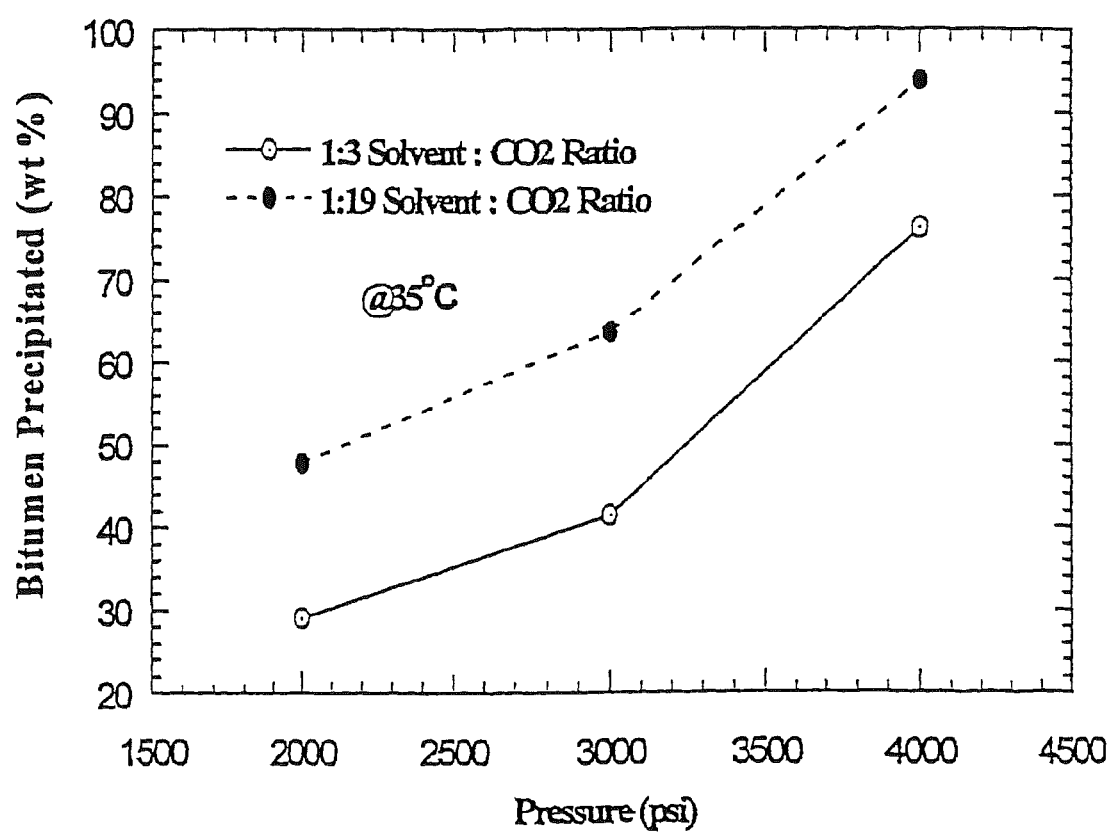

FIG. 4 compares precipitated bitumen (weight percent) versus pressure at different solvent to carbon dioxide ratios, and corresponds to Example 11.

Figure 5:
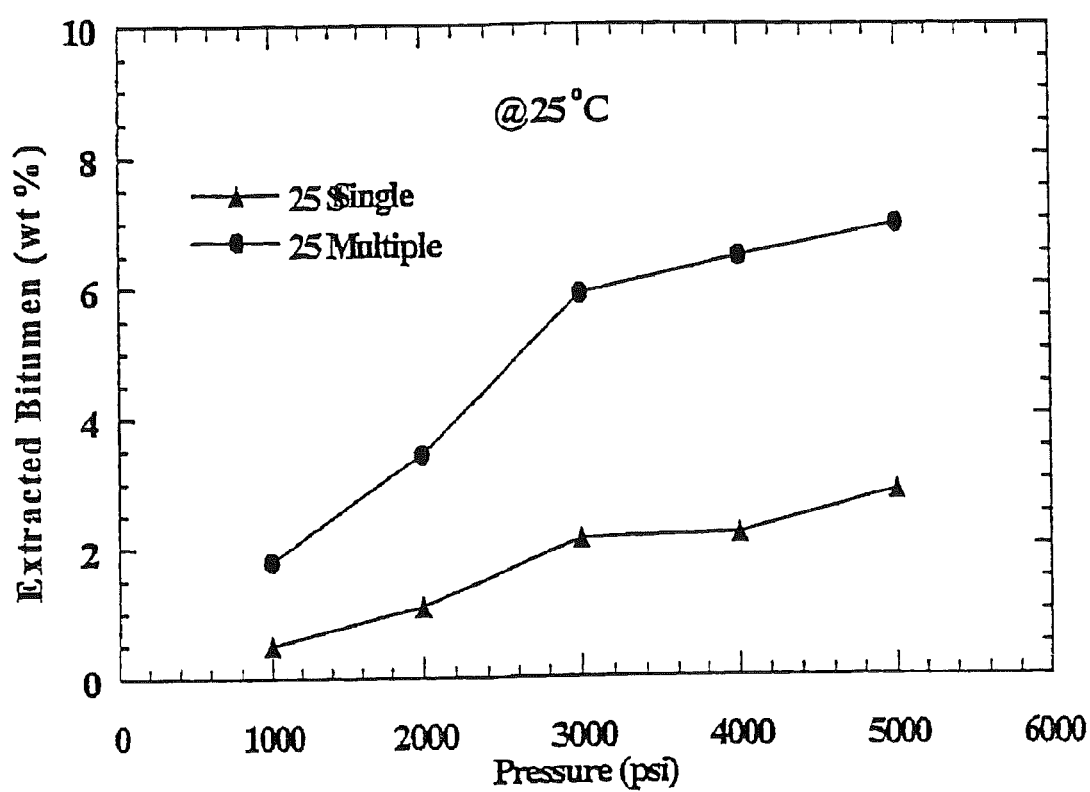

FIG. 5 compares precipitated bitumen (weight percent) versus pressure using single batch extraction and multiple batch extraction at 25° C., and corresponds to Example 12.

Figure 6:
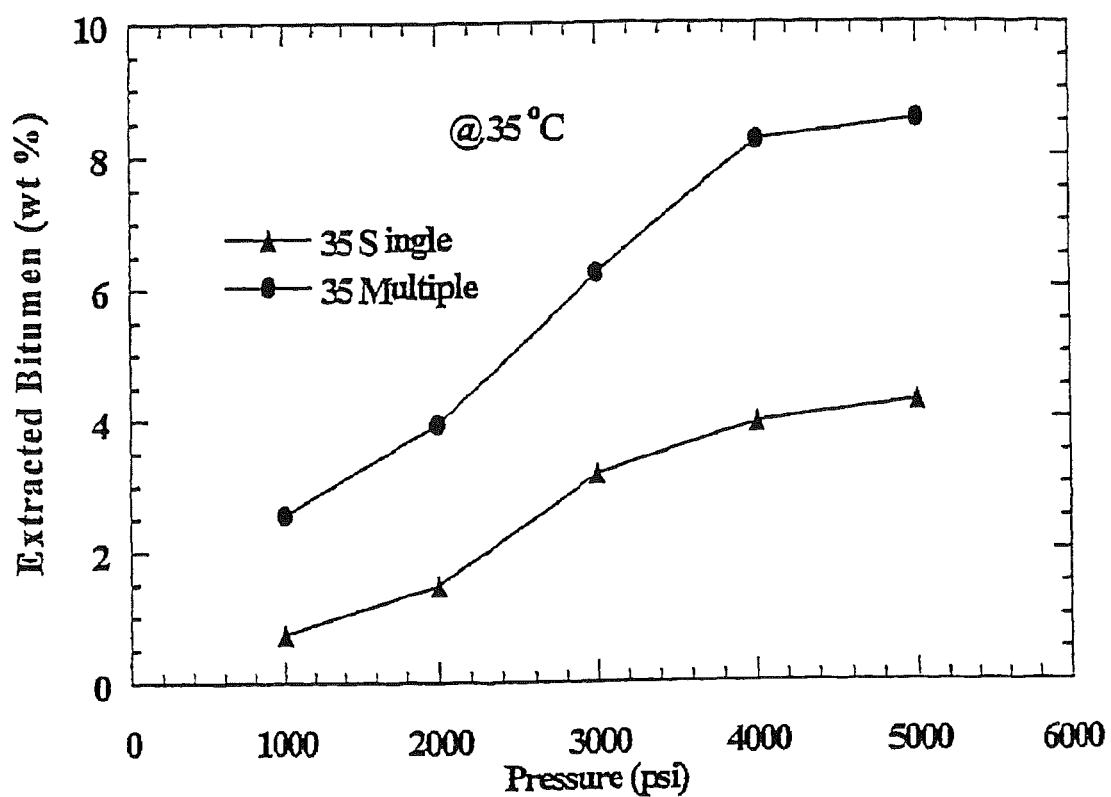

FIG. 6 compares precipitated bitumen (weight percent) versus pressure using single batch extraction and multiple batch extraction at 35° C., and corresponds to Example 13.

Figure 7:
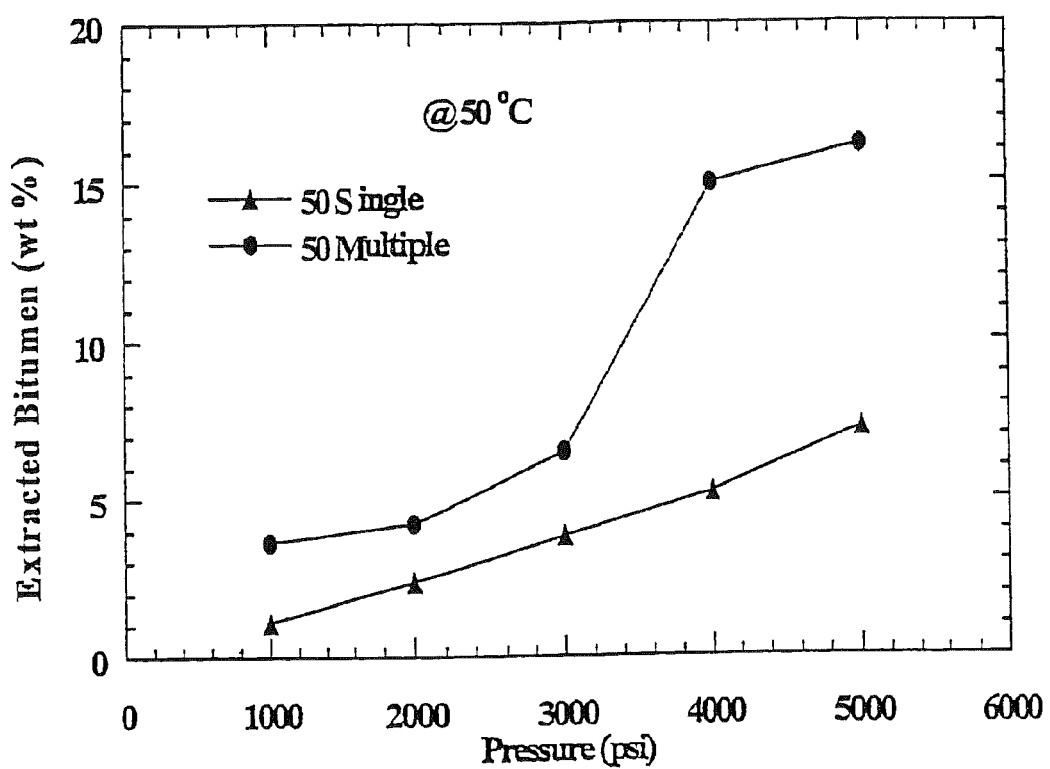

FIG. 7 compares precipitated bitumen (weight percent) versus pressure using single batch extraction and multiple batch extraction at 50° C., and corresponds to Example 14.

Figure 8:
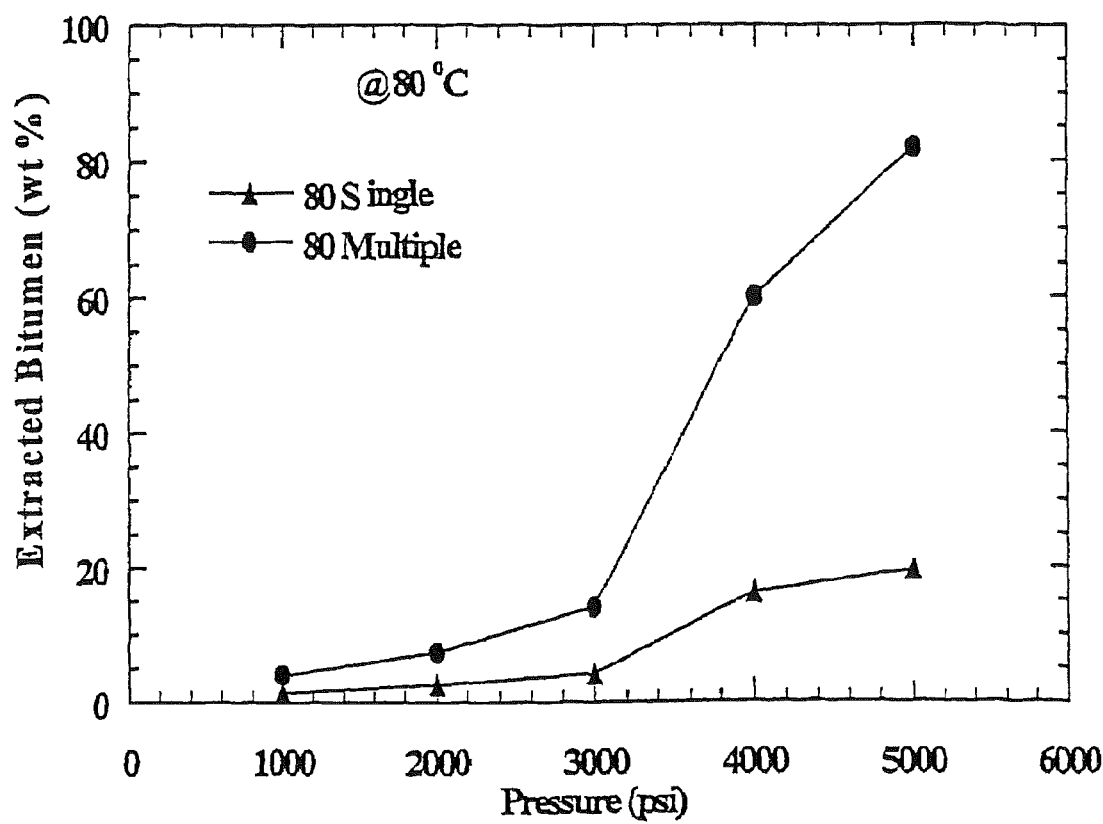

FIG. 8 compares precipitated bitumen (weight percent) versus pressure using single batch extraction and multiple batch extraction at 80° C., and corresponds to Example 15.

Figure 9:
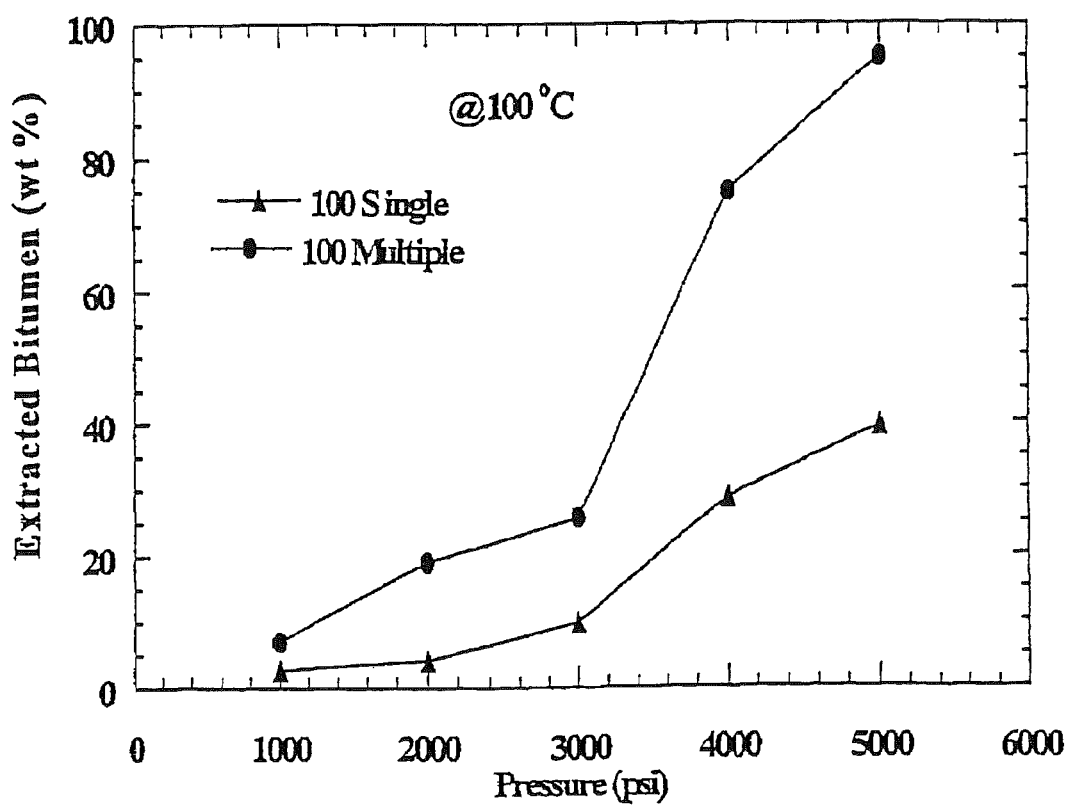

FIG. 9 compares precipitated bitumen (weight percent) versus pressure using single batch extraction and multiple batch extraction at 100° C., and corresponds to Example 16.

FIG. 10 compares the amount of extracted bitumen as a function of both temperature and pressure, and corresponds to Example 18.

FIG. 11 compares the amount of extracted bitumen as a function of both temperature and pressure, and corresponds to Example 19.

DETAILED DESCRIPTION OF THE INVENTION

This invention may, however, be embodied in many different forms and should not be construed as limited to the embodiments set forth herein; rather, these embodiments are provided so that this disclosure will be thorough and complete, and will fully convey the scope of the invention to those skilled in the art and optionally collected or removed.

In general, the present invention provides a method of dissolving a petroleum-based substance. The petroleum-based substance is contacted with a carbon dioxide miscible solvent and a portion of the petroleum-based substance is dissolved. The dissolved petroleum-based substance is separated and contacted with carbon dioxide such that the petroleum-based substance is precipitated.

For example, a substrate is contacted with a carbon dioxide miscible solvent to extract or remove a residue or desired substance from the substrate. A substrate may be fed to a first reaction chamber to which a solvent is also fed. The solvent contacts the substrate within the reaction chamber and dissolves or otherwise separates a residue or desired substance from the substrate. A product stream of the solvent with dissolved and/or suspended residue or substances removed from the substrate in the first reaction chamber may then be fed to a second reaction chamber where the solvent is contacted with carbon dioxide to remove any residue dissolved or otherwise suspended in the solvent from the solvent.

In various embodiments, the invention provides a method of removing petroleum residue from a substrate. A substrate may be an organic substrate, an inorganic substrate, or a combination thereof. The method comprises contacting the substrate with a solvent such that the petroleum residue separates from the substrate and is dissolved in the solvent. The solvent, in addition to being carbon dioxide miscible, is preferably an environmentally friendly solvent such as a solvent that is Generally Recognized As Safe. Such solvents are also known as "GRAS solvents" and such term is used throughout the description to represent such solvents. For instance, ester-containing solvents such as benzoic acid ester-containing solvents are representative GRAS solvents that may be used as compositions of various embodiments of the present invention or with the methods of various embodiments of the present invention.

The term "substrate" is to be construed broadly and refers to various liquid materials, solid materials, combinations thereof, including, without limitation, semi-liquid and/or semi-solid materials, which contain a substance or residue to be removed, dissolved or extracted. In various embodiments, the residue may be "on" the surface of the substrate, may be embedded, entrained or contained within the substrate, or may be partially embedded, entrained or contained within the substrate. Inorganic (e.g., metal and ceramic) and organic substrates, as well as alloys and composites thereof, are well within the scope of the invention. In various embodiments, for example petroleum substance recovery processes, exemplary substrates may be present in and/or on articles of manufacture employed in the petroleum refining, storage, and transportation fields, including, without limitation, cleaning storage tanks, electrostatic desalters, API separators, slop oil tanks, electrostatic precipitators, crude oil storage tanks, gas separators, pipelines, reservoirs, and the like.

The term "inorganic substrate" is to be construed broadly and refers to various materials that contain a petroleum residue. In particular, the petroleum residue may be "on" the surface of the substrate, may be embedded, entrained or contained within the substrate, or may be partially embedded, entrained or contained within the substrate. Inorganic substrates include those formed from or containing inorganic compounds such as, without limitation, mineral ores, mineral oxides, rock, clay, silica, as well as combinations thereof. Preferred inorganic substrates are those that are tar or oil sands and oil shales.

The term "dissolved in the solvent" is to be broadly construed to refer to residue being solubilized or entrained in a solvent. The term may refer to a one-phase solution or a multi-phasic, or biphasic, dispersion or suspension in the solvent. Accordingly, the term is intended to encompass all embodiments in which a residue could be fully soluble, partially soluble, or insoluble in a solvent according to embodiments of the present invention.

The term "tar or oil sands" is defined broadly as porous sandstone structures occurring on the surface and depths well below the surface that are impregnated with heavy, viscous black crude oil that typically cannot be retrieved well by conventional production techniques. For the purposes of the invention, the terms "bituminous sands" or "oil sands" may be used as an alternative to tar sands. Tar sands typically contain a sizeable proportion of bitumen, containing primarily asphaltenes and heavy low volatility fractions of maltha, typically together with a substantial percentage of sulfur and heavy metals.

The term "oil shale" is to be broadly construed and typically refers to extensive sedimentary rock deposits typically containing a relatively high percentage of kerogen.

For the purposes of the invention the term "petroleum residue" is to be broadly construed and includes, without limitation, material that is typically present in various applications that are related to petroleum products (e.g., crude oils, asphaltic residues, coal tar, waxes, resins, petroleum sludges, and tank bottoms), and any number of by-products. For the purposes of the invention, "petroleum residue" encompasses heavy petroleum fractions preferably having a boiling point of at least 150° C. or 200° C., more preferably at least 340° C., which includes a mixture of paraffinic and aromatic hydrocarbons along with heterocyclic compounds containing sulfur, nitrogen, and oxygen. Asphalt, as well as residues and related materials thereof, also are construed as being encompassed by the term "petroleum residue" for the purposes of the invention. The asphalt content varies considerably as known by one skilled in the art. For example, in one embodiment, the asphalt content may vary from 3 to 8 percent. In another embodiment, the asphalt content may vary from 4 to 6 percent. The asphalt content may be higher or lower. For example, in a roofing application, the asphalt content may be higher.

As understood by one skilled in the art, asphalt is a product of crude oil refining. In an exemplary asphalt production process, crude oil is distilled in a primary flash distillation column, the residue of this process is introduced to an atmospheric distillation column. The residue of the atmospheric distillation process is typically distilled under reduced pressure (e.g., vacuum distillation), and the residue is termed asphalt. The asphalt produced from the vacuum distillation of crude oil typically has softening points ranging from 25° C. to 55° C. Asphalts of intermediate softening points may be made, for example, by blending with higher and lower softening point asphalts. If the asphalt has a low softening point, it can be hardened by further distillation with steam or by oxidation (e.g., air blowing). Furthermore, asphalt can be also produced by propane deasphalting in the production of lubricating oils from crude oil residual. The asphalt produced by propane deasphalting may have a softening point of about 90° C. Softer grades may be made by blending the hard asphalt with the extract obtained in the solvent treatment of lubricating oils.

In general, "asphalt" may be defined as the residue of mixed-base and asphalt-base crude oils. For the most part, it is difficult to distill even under the highest vacuum, because such temperatures which are often employed tend to promote formation of coke. For the most part, asphalts have complex chemical and physical compositions that usually vary with the source of the crude oil and are considered dispersions or solutions of particles or aggregates, called asphaltenes, in a high-boiling fluid composed of oil and resins. Asphaltene content in petroleum residues vary widely as known. As appreciated in the art, the nature of the asphalt is often determined by such factors as the nature of the medium (e.g., paraffinic or aromatic), as well as the nature and proportion of the asphaltenes and of the resins. The polar and fused ring portions of the asphaltenes have been suggested to be lyophobic; the resins are considered to be lyophilic, and the "interaction" of the resins with the asphaltenes is believed to be responsible for asphaltene solvation or dispersion, which seems to exercise marked control on the quality of the asphalt. The asphaltenes vary in character, but typically are either of sufficiently high molecular weight or aggregate size to require solvation or dispersion by the resins. Various asphaltic materials may be removed from substrates by the various embodiments of the present invention. As an example, cutbacks and emulsions compose liquid asphalts. A cutback may be defined as a cement that has been liquefied with solvents such as, for example, naptha or gasoline or kerosene. Emulsified asphalts are mixtures of asphalt cement, water and an emulsifying agent.

An important class of petroleum residue is bitumen. As known in the art, "bitumen" is defined as a mixture of hydrocarbons occurring in the petroleum. Other components such as, for example, oils, waxes, resins, pitch and tack are typically present in the petroleum residue. Bitumen is also well understood to be the liquid fuel product obtained by extraction of petroleum from tar or oil sands. Another component of the petroleum residue is the asphaltene fraction, which is present as part of the bitumen. For the purposes of this invention, the term "asphaltenes" is defined to be components of the high boiling point fraction of the crude oil which are composed of polynuclear aromatic hydrocarbons of molecular weights ranging from 500 to 2000 or greater and aggregate molecular weights of up to 20,000 joined by alkyl chains. See, e.g., *Hawley's Condensed Chemical Dictionary*, $12^{th}$ Ed., Richard J. Lewis, Sr., Editor, (1993), p. 101.

As discussed above, a solvent according to an embodiment of the present invention may include an ester contained GRAS solvent, and for example a benzoic acid ester-containing solvent. The benzoic acid ester containing solvent comprises one or more benzoic acid esters. Exemplary benzoic acid esters include, without limitation, methyl benzoic acid ester, ethyl benzoic acid ester, n-propylbenzoic acid ester, isobutylbenzoic acid ester, n-butyl benzoic acid ester, tert-butyl benzoic acid ester, isomers of pentylbenzoic acid ester, isopropylbenzoic acid ester, and mixtures thereof.

An exemplary benzoic acid ester is isopropylbenzoic acid ester ("IPB"). Preferably, in various embodiments, the benzoic acid ester-containing solvent contains at least about 70, 80, 85, 90, 95, or 99 percent by weight of the one or more benzoic acid esters. In one preferred embodiment, the benzoic acid ester-containing solvent contains from about 90 to about 95 percent by weight of the one or more benzoic acid esters. The benzoic acid ester may contain other components, processing aids, and the like as deemed appropriate by one skilled in the art.

The benzoic acid ester-containing solvent is potentially environmentally-advantageous in that, in a preferred embodiment, it has a flash point (open cup) greater than about 98° C. (e.g., 98.9° C.). The benzoic acid ester-containing solvent is potentially nontoxic, readily biodegradable, and has a UK OCNS rating category E which is the least toxic category of this method of evaluating toxic chemicals, meanwhile category A being the most toxic. Any compound rated from C-E typically signifies that the material may be readily biodegradable and may be nonbioaccumulative (Offshore Chemical Notification Scheme).

In one preferred embodiment, the benzoic acid ester-containing solvent is substantially devoid of surfactant; in any event, as an example, the benzoic acid ester-containing solvent may, in certain preferred embodiments, contain no more than about 0.01 weight percent of surfactant. Accordingly, in embodiments which employ little if any surfactant, the benzoic acid ester-containing solvent is non-foaming. In other preferred embodiments, the benzoic acid ester-containing solvent is non-ionic. In other embodiments, the benzoic acid ester-containing solvents may be free or essentially free of phosphate-acids, halogen-containing compounds (e.g., chlorine-containing solvents such as methylene chloride and 1,1, 1-trichloroethane), and/or petroleum distillates, as well as combinations thereof, e.g., preferably 1, 0.5, or 0.1 percent by weight of such solvents. Advantageously, after extraction in one embodiment, the concentration of petroleum residue in the benzoic acid ester-containing solvent may range from about 5 to about 30 weight/volume (wt/vol) percent.

Other components may be used in the benzoic acid ester-containing solvent, the selection of which is known to one skilled in the art. For example, limonene, terpeneoids, alkyl phthalate esters, alkyl esters of cyclohexanoic acid, glycerol fatty acid esters (diglycerides and triglycerides), glycerol, ethylene glycol, polyethylene glycol, propylene glycol, alkanolamines, such as: ethanolamine, diethanolamine, triethanolamine, propanolamine, and butanolamine may be used.

Other GRAS solvents may include other ester-containing solvents. In a preferred embodiment, the ester is an "aromatic ester compound" which may be defined as an ester-containing substituent attached to a substituted or an unsubstituted aromatic ring. Exemplary ester compounds include, without limitation, salicylic acid esters, cinnamic acid esters, propionic acid esters, butyric acid esters, pentanoic acid esters, and hexanoic acid esters.

Exemplary salicylic acid esters include, without limitation, methyl salicylate, ethyl salicylate, n-propyl salicylate, isobutyl salicylate, n-butyl salicylate, tert-butyl salicylate, isomers of pentyl salicylate, isomers of hexyl salicylate, isomers of heptyl salicylate, isopropyl salicylate, and mixtures thereof.

Exemplary cinnamic acid esters include, without limitation, methyl cinnamate, ethyl cinnamate, n-propyl cinnamate, isobutyl cinnamate, n-butyl cinnamate, tert-butyl cinnamate, isomers of pentyl cinnamate, isomers of hexyl cinnamate, isomers of heptyl cinnamate, isopropyl cinnamate, benzyl cinnamate, and mixtures thereof.

Exemplary propionic acid esters include, without limitation, phenyl propionate, benzyl propionate, hydroxyphenyl propionate, methyl phenyl propionate, isobutyl phenyl propionate, n-butyl phenyl propionate, tert-butyl phenyl propionate, isomers of pentyl phenyl propionate, isomers of hexyl phenyl propionate, isomers of heptyl phenyl propionate, isopropyl phenyl propionate, and mixtures thereof.

Exemplary butyric acid esters include, without limitation, phenyl butyrate, benzyl butyrate, hydroxyphenyl butyrate, methyl phenyl butyrate, isobutyl phenyl butyrate, n-butyl phenyl butyrate, tert-butyl phenyl butyrate, isomers of pentyl phenyl butyrate, isomers of hexyl phenyl butyrate, isomers of heptyl phenyl butyrate, isopropyl phenyl butyrate, and mixtures thereof.

Exemplary pentanoic acid esters include, without limitation, phenyl pentanoate, benzyl pentanoate, hydroxyphenyl pentanoate, methyl phenyl pentanoate, isobutyl phenyl pentanoate, n-butyl phenyl pentanoate, tert-butyl phenyl pentanoate, isomers of pentyl phenyl pentanoate, isomers of hexyl phenyl pentanoate, isomers of heptyl phenyl pentanoate, isopropyl phenyl pentanoate, and mixtures thereof.

Exemplary hexanoic acid esters include, without limitation, phenyl hexanoate, benzyl hexanoate, hydroxyphenyl hexanoate, methyl phenyl hexanoate, isobutyl phenyl hexanoate, n-butyl phenyl hexanoate, tert-butyl phenyl hexanoate, isomers of pentyl phenyl hexanoate, isomers of hexyl phenyl hexanoate, isomers of heptyl phenyl hexanoate, isopropyl phenyl hexanoate, and mixtures thereof.

Preferably, the ester-containing solvent contains at least about 70, 85, 90, 95, or 99 percent by weight of the one or more of the esters. In one preferred embodiment, the ester-containing solvent contains from about 70 to about 95 percent by weight of the ester. The ester-containing solvent may contain other components, processing aids, and the like as deemed appropriate by one skilled in the art.

The method of removing petroleum residue from a substrate may encompass numerous steps. In one embodiment, for example, the method further comprises the step of contacting the carbon dioxide miscible or GRAS solvent with a fluid comprising carbon dioxide, wherein the petroleum residue is recovered in the fluid such that the carbon dioxide miscible or GRAS solvent is separated from the petroleum residue, e.g., at least 95 weight percent of the carbon dioxide miscible or GRAS solvent is separated from the petroleum residue. Furthermore, the method of the invention may further comprise the step of recycling the carbon dioxide miscible or GRAS solvent for further use. Moreover, in another embodiment, the invention may encompass the step of subjecting the substrate to a fluid or gas comprising carbon dioxide ("$CO_2$") or hydrocarbon gas to remove a portion of the petroleum residue from the substrate, with the subjecting step occurring prior to the step of contacting the substrate with the carbon dioxide miscible or GRAS solvent.

In one embodiment, bitumen can be removed and recovered from a petroleum residue. The substance containing bitumen is contacted, preferably in a reaction vessel, with a GRAS solvent. At least a portion of the bitumen is dissolved in the solvent. The dissolved bitumen and solvent is contacted with $CO_2$ to precipitate the bitumen from the solvent. The precipitated bitumen is then recovered. The weight of bitumen extracted may be determined from weight measurements of the sample before and after contacting with the GRAS solvent. The solvent may remove from about 5, 10, 20, 30, or 40 to about 60, 70, 80, 90, or 100 percent by weight of bitumen from a petroleum residue based on the weight of bitumen that is present in the residue. In one embodiment, a petroleum residue comprises asphaltene. In a preferred embodiment, the contacting step comprises removing from about 60 or 70 to about 80, 90, or 100 percent by weight of asphaltene based on the asphaltene present in the petroleum residue, although it should be appreciated that other amounts may be removed in accordance with the present invention. The asphaltene content of the petroleum residue ranges from about 1 to 30 percent by weight, although it should be appreciated that other amounts may be removed in accordance with the present invention.

For the purposes of the invention, carbon dioxide may be employed in the fluid in a liquid, gaseous, or supercritical phase. Preferably, the fluid comprises carbon dioxide in a continuous phase, and typically has a concentration ranging from about 10, 20, 30, or 40 to about 60, 70, 80, 90 or up to 100 percent by weight of carbon dioxide. If liquid $CO_2$ is used, the temperature employed during the process is preferably below 31° C. If gaseous $CO_2$ is used, it is preferred that the phase be employed at high pressure. As used herein, the term "high pressure" generally refers to $CO_2$ having a pressure from about 500 to about 5,000 psi. In a preferred embodiment, the $CO_2$ is utilized in a "supercritical" phase. As used herein, "supercritical" means that a fluid medium is above its critical temperature and pressure, i.e., above about 31° C. and above about 71 bar (1,073 psi) for $CO_2$. The thermodynamic properties of $CO_2$ are reported in Hyatt, *J. Org. Chem.* 49: 5097-5101 (1984); therein, it is stated that the critical temperature of $CO_2$ is about 31° C.; thus the method of the present invention may be carried out at a temperature above 31° C. A preferred pressure of the carbon dioxide containing fluid ranges from about 1000 psi to 3000 psi.

Other optional components may be used in the fluid containing carbon dioxide, the selection of which is known to one skilled in the art. Examples of other components include, without limitation, co-solvents, surfactants, co-surfactants, buffers, rheology modifiers, biological agents, and viscosity reduction modifiers. Other components may be used in the carbon dioxide containing fluid, the selection of which may be determined by the skilled artisan. The components that may be added to $CO_2$ include but are not limited to gases such as, nitrogen, oxygen, argon, helium, nitrogen dioxide, methane, ethane, propane, butane, and hydrogen sulfide, alcohols such as, methanol, ethanol, isopropanol, n-propanol, and the like, ethers, such as, dimethyl ether, methyl-ethyl ether, methyl-isopropyl ether and the like, polymers, specially those that are soluble in $CO_2$ such as polysiloxanes, fluorinated polymers such as, poly(hexafluoropropylene oxide) poly(vinyledenefluoride), sugar-containing diblock fluorocopolymers, Bis(perfluoro-2-N-propoxypropionyl)peroxide and fluorosurfactants such as, poly(1,1-dihydroperfluorooctyl acrylate), PS-b-poly(dimethylsiloxane) and 1,1-dihydroperfluorooctyl acrylate-hexamethylcyclotrisiloxane diblock copolymer. It is also contemplated that gases other than $CO_2$ could be employed. For example, hydrocarbon gases such as methane, ethane or argon or mixtures thereof can be used.

The removal of petroleum residue from the substrate may be carried out by using known equipment. The solvent, for example, may be applied to the substrate by using known and accepted systems. In a preferred embodiment, the application of the benzoic acid ester-containing solvent typically takes place from about 1 to about 20 min, at a temperature ranging from about 10° C. to about 50° C. With respect to asphalt cleaning for example, the solvent is typically sprayed under pressure on the residue-containing tools that are placed on a perforated grid capable of filtering the solvent from the inorganic solvent-insoluble contaminants. The filtered solvent is stored in containers for further treatment with $CO_2$.

Embodiments encompassing the use of the fluid containing carbon dioxide may take place in a number of vessels, cells, or other delivery systems, the selection of which is known to one skilled in the art. For example, the extraction of the petroleum residue may be carried out either batchwise, continuously, or semi-continuously, in appropriately designed reaction vessels or cells. Additional features may be employed such as, for example, agitation devices (e.g., a paddle stirrer or impeller stirrer) and heaters (e.g., a heating furnace or heating rods). These vessels or cells may be modified in accordance with the scope of the present invention, particularly in view of the specific substrate.

In general, the methods of the present invention may employ solvents for removing petroleum residue in a number of varied applications. Examples of such applications include, without limitation:

Agricultural applications, such as: cattle sprays, damp-proofing and waterproofing buildings and structures, disinfectants, fence post coating, mulches, mulching paper, paved barn floors, barnyards, feed platforms, and the like, protecting tanks, vats, and the like, protection for concrete structures, tree paints, water and moisture barriers (above & below ground), wind and water erosion control, and weather modification areas. Buildings and building applications, such as: floors, e.g., damp-proofing and water-proofing building and structures, floor compositions, tiles and coverings, insulating fabrics, papers, step treads; roofing, e.g., building papers, built-up roof adhesives, felts, primes, caulking compounds, cement waterproofing compounds, cleats for roofing, glass wool compositions, insulating fabrics, felts, papers, joint filler compounds, laminated roofing, shingles, liquid roof coatings, plastic cements, and shingles; walls, siding, ceilings, e.g., acoustical blocks, compositions, felts, architectural decoration, bricks, brick siding, building blocks, papers, damp-proofing coatings, compositions, insulating board, fabrics, felts, paper, joint filler compounds, masonry coatings, plaster boards, putty, asphalt, siding compositions, soundproofing, stucco base, and wallboard; hydraulics and erosion control applications, e.g., canal linings, sealants, catchment areas, basins, dam groutings, dam linings, protection, dike protection, ditch linings drainage gutters, structures, embankment protection, groins, jetties, levee protection, mattresses for levee and bank protection, membrane linings, waterproofing, ore leaching pads, reservoir linings, revetments, sand dune stabilization, sewage lagoons, oxidation ponds, swimming pools, waste ponds, and water barriers; industrial applications, e.g., aluminum oil compositions using asphalt backed felts, conduit insulation, lamination, insulating boards, paint compositions, papers, pipe wrapping, roofing, shingles, automotive, acoustical compositions, felts, brake linings, clutch facings, floor sound deadeners, friction elements, insulating felts, panel boards, shim strips, tacking strips, underseal, electrical, armature carbons, windings, battery boxes, carbons, electrical insulating compounds, papers, tapes, wire coatings, junction box compound, molded conduits, compositions, black grease, buffing compounds, cable splicing compound, embalming, etching compositions, extenders, rubber, other, explosives, fire extinguisher compounds, joint fillers, lap cement, lubricating grease, pipe coatings, dips, joint seals, plastic cements, plasticizers, preservatives, printing inks, well drilling fluid, wooden cask liners, impregnated, treated materials, armored bituminized fabrics, burlap impregnation, canvas treating, carpeting medium, deck cloth impregnation, fabrics, felts, mildew prevention, packing papers, pipes and pipe wrapping, planks, rugs, asphalt base, saw dust, cork, asphalt composition, textiles, waterproofing, tiles, treated leather, wrapping papers, paints, varnishes, etc, acid-proof enamels, mastics, varnishes, acid-resistant coatings, air-drying paints, varnishes, anti-corrosive & anti-fouling paints, anti-oxidants and solvents, base for solvent compositions, baking and heat resistant enamels, boat deck sealing compound, lacquers, japans, marine enamels, belting, blasting fuses, briquette binders, burial vaults, casting molds, clay articles, clay pigeons, depilatory, expansion joints, flower pots, foundry cores, friction tape, gaskets, imitation leather, mirror backing, phonograph records, rubber, molded compounds, shoe fillers, soles, table tops, airport runways, taxiways, aprons, etc., asphalt blocks, brick fillers, bridge deck surfacing, crack fillers, curbs, gutters, drainage ditches, floors for buildings, warehouses, garages, etc., highways, roads, streets, shoulders, parking lots, driveways, pcc underseal, roof-deck parking, sidewalk, footpaths, soil stabilization, ballast-treatment, curve lubricant, dust laying, paved ballast, sub-ballast, paved crossings, freight yards, station platforms, rail fillers, railroad ties, tie impregnating, stabilization, paved surfaces for: dance pavilions, drive-in movies, gymnasiums, sports arenas, playgrounds, school yards, race tracks, running tracks, skating rinks, swimming & wading pools, tennis courts, handball courts, crude oil spills, wildlife cleanup, and tar sand separation.

In another embodiment, the invention relates to a method for determining the quantity of bitumen present in a petroleum residue sample comprising bitumen. The method comprises contacting the petroleum residue sample with a GRAS solvent to remove the bitumen therefrom. The weight of the bitumen in the sample is determined by comparing the initial weight of the petroleum residue and the weight of the remaining portion of the petroleum residue. In a preferred embodiment, a remaining portion of the petroleum residue is present in the form of inorganic material.

The method of determining the quantity of bitumen present in a petroleum residue sample may include other optional embodiments. As an example, the petroleum residue comprises bitumen and inorganic material, and wherein the inorganic material remains subsequent to the step of contacting the petroleum residue sample with a GRAS solvent, the method further comprising contacting the inorganic material at least once with an organic solvent to remove GRAS solvent from the petroleum residue sample. Preferably, the inorganic material is contacted several times with the organic solvent.

A number of organic solvents may be employed in the above method. Exemplary organic solvents include, without limitation, $C_1$-$C_4$ alcohols. A preferred organic solvent is ethanol.

Optionally, the method of determining the quantity of bitumen present in a petroleum residue sample may also include various other steps set forth herein, including without limitation, those involving carbon dioxide. As an example, in one embodiment, the method further comprising the step of contacting the benzoic acid ester-containing solvent comprising petroleum residue with a fluid comprising carbon dioxide, wherein the petroleum residue is recovered in the fluid such that the benzoic acid ester-containing solvent is separated from the petroleum residue.

The invention will now be described in greater detail with respect to the examples that follow. It should be understood that these examples are set forth merely for illustrating the invention, and do not limit the scope of the invention as defined by the claims.

Example 1

Experimental Protocol for Single-Batch Extraction Experiments of Tar Sand Samples Using $CO_2$ A tar sand sample is placed in a high-pressure 20 mL capacity reactor. The reactor is heated to the desired temperature, the system is pressurized with $CO_2$ at 10 mL/min flow rate until the desired pressure is reached by means of a high-precision syringe pump. The system is left for 1 hr at the desired temperature and pressure after which $CO_2$ and the extracted bitumen is conveyed under pressure to another reactor supplied with sapphire windows (view-cell) at a rate of 10 mL/min. After cooling the extract to ambient temperature, $CO_2$ is slowly discharged from the system at a rate of 1 mL/min. The system is thereafter opened, the extracted bitumen is collected quantitatively by dissolving in $MeCl_2$, and the solvent is evaporated in a vacuum oven at 50° C. for 24 hrs.

The mass of the extracted bitumen is calculated and the percentage extraction is obtained. The total bitumen content of the sample is determined by $MeCl_2$ extraction.

Example 2

Experimental Protocol for Single-Batch Extraction Experiments of Asphalt Samples Using $CO_2$ The procedure according to Example 1 is repeated except that an asphalt sample is employed instead of a tar sand sample.

Example 3

Experimental Protocol for Single-Batch Extraction Experiments of Bitumen Samples Using $CO_2$ The procedure according to Example 1 is repeated except that a bitumen sample is employed instead of a tar sand sample.

Example 4

Extraction of Bitumen from Tar Sands Using Esters

A bitumen sample, either subjected to extraction with $CO_2$, or without being subjected to $CO_2$ extraction, is placed in a Buchner funnel. The ester solvent or solvent mixture is added continuously until the color of the liquid did not changed, indicating complete bitumen extraction. The solution of bitumen in the aromatic ester solvent, or solvent mixture, is then charged in a high-pressure view cell. $CO_2$ is pressurized at a specified flow rate until the desired pressure is reached using a precision syringe pump. The temperature is maintained and controlled at the set temperature by means of a thermostated heating tape. The system is stirred by means of a magnetic stirrer. The system is left to equilibrate until there was no more bitumen precipitation observed through the sapphire windows of the view cell. When apparent complete precipitation of bitumen occurred, the compressed gas is allowed to discharge into a series of cooled traps, where $CO_2$ is separated from the ester solvent. When the system was completely depressurized from $CO_2$, the precipitated bitumen is retrieved and quantified.

Example 5

Isopropyl Salicylate Miscibility in Carbon Dioxide

The miscibility of isopropyl salicylate is evaluated in liquid, gaseous, or supercritical carbon dioxide under a number of conditions using high pressure equipment. Carbon dioxide is determined to be completely miscible with isopropyl salicylate at the following conditions: 1:1, 1:2, 1:3, 1:4, 1:5, 2:1, 3:1, 4:1, and 5:1, $CO_2$: isopropyl salicylate vol.:vol. ratios, at the following temperatures: 25, 35, 45, and 60° C., and at the following pressures: 500, 1000, 1500, 2000, 2500, 3000, 3500, 4000, 4500, and 5000 psi.

Example 6

Experimental Protocol for Multiple-Batch Extraction Experiments Using $CO_2$

An asphalt sample is placed in a high-pressure 20 mL capacity reactor. The reactor is heated to the desired temperature and then pressurized with $CO_2$ to the desired pressure at 10 mL/min flow rate by means of a high-precision syringe pump. The system is left for 1 hr at the desired temperature and pressure after which $CO_2$ and the extracted bitumen is conveyed under pressure to another reactor supplied with sapphire windows (view-cell) at a rate of 10 mL/min followed by another transfer to a second view cell in the same manner. After cooling the extract to ambient temperature, $CO_2$ is slowly discharged from the system at a rate of 1 mL/min, the system is repressurized as described in the above steps. The process is repeated six times and the residence time for each step is fixed at 15 min. At the end of the sixth extraction, the system is opened, and the extracted bitumen is collected from both of the two view cells quantitatively by dissolving in $MeCl_2$. The solvent is then evaporated in a vacuum oven at 50° C. for 24 hrs. The mass of the extracted bitumen is then calculated and the percentage extraction is obtained.

The total bitumen content of asphalt is obtained by $MeCl_2$ extraction.

Example 7

Extraction of Bitumen from Tar Sands Using a Benzoic Acid Ester

A bitumen sample, either subjected to extraction with $CO_2$, or without being subjected to $CO_2$ extraction, is placed in a Buchner funnel. The benzoic acid ester solvent or solvent mixture is added continuously until the color of the liquid did not change, indicating complete bitumen extraction. The solution of bitumen in the solvent is then charged in a high-pressure view cell. $CO_2$ is pressurized at a specified flow rate until the desired pressure is reached using a precision syringe pump. The temperature is maintained and controlled at the set temperature by means of a thermostated heating tape. The system is stirred by means of a magnetic stirrer. The system is left to equilibrate until there is no more bitumen precipitation observed through the sapphire windows of the view cell. When apparent complete precipitation of bitumen occurred, the compressed gas is allowed to discharge into a series of cooled traps, where $CO_2$ is separated from the aromatic ester solvent. When the system is completely depressurized from $CO_2$, the precipitated bitumen is retrieved and quantified.

Example 8

Effect of Temperature on Bitumen Precipitation

The effect of temperature on the removal of bitumen from a benzoic acid ester-containing solvent by employing a carbon dioxide fluid is measured. The bitumen is present in the solvent in an amount of 4 wt./vol/percent. The bitumen is present in the solvent in a 1:3 ratio. As can be seen from FIG. 1, the amount of precipitated bitumen decreased with temperature for a given pressure value.

Example 9

Effect of Concentration on Bitumen Precipitation

The effect of bitumen concentration in a benzoic acid ester-containing solvent on subsequent precipitation in a carbon dioxide fluid is evaluated. The precipitation runs are carried out at 35° C. for a 2 hr residence time within a reactor that is mixed with a magnetic stirrer.

As seen from FIG. 2, bitumen precipitation in the carbon dioxide fluid increased as a function of solvent concentration.

Example 10

Bitumen Precipitation from Benzoic Acid Ester-Containing Solvent as a Function of Carbon Dioxide Density The precipitation of bitumen is evaluated as a function of carbon dioxide density at various temperatures ranging from 35° C. to 55° C. and pressures ranging from 2000 psi to 4000 psi. The residence time is 2 hr.

As illustrated by FIG. 3, the amount of bitumen that is precipitated increases as a function of carbon dioxide density.

Example 11

Effect of Benzoic Acid Ester-Containing Solvent-to-Carbon Dioxide Fluid Ratio on Bitumen Precipitation The effect of benzoic acid ester-containing solvent-to-carbon dioxide fluid ratio on bitumen precipitation is evaluated at 35° C. As seen from FIG. 4, the amount of precipitated bitumen increased as the ratio of solvent to carbon dioxide fluid decreased.

Example 12

Comparison Between Single and Multiple Extraction of Bitumen in Carbon Dioxide

A comparison between a single batch extraction and a multiple batch extraction of bitumen in carbon dioxide is illustrated in FIG. 5. The study is carried out at 25° C. As seen, the multiple batch extractions provided for higher yields of extracted bitumen.

Example 13

Comparison Between Single and Multiple Extraction of Bitumen in Carbon Dioxide

The procedure according to Example 12 is repeated except that the temperature is set at 35° C. The results are shown in FIG. 6. In general, the yields are higher in comparison to Example 10.

Example 14

Comparison Between Single and Multiple Extraction of Bitumen in Carbon Dioxide

The procedure according to Example 12 is repeated except that the temperature is set at 50° C. The results are shown in FIG. 7. In general, the yields are higher in comparison to those set forth in Examples 12-13.

Example 15

Comparison Between Single and Multiple Extraction of Bitumen in Carbon Dioxide

The procedure according to Example 12 is repeated except that the temperature is set at 80° C. The results are shown in FIG. 8. In general, the yields are higher in comparison to those set forth in Examples 12-14.

Example 16

Comparison Between Single and Multiple Extraction of Bitumen in Carbon Dioxide The procedure according to Example 12 is repeated except that the temperature is set at 100° C. The results are shown in FIG. 9. In general, the yields were higher in comparison to those set forth in Examples 12-14.

Example 17

Benzoic Acid Ester Solvent Cleaning Measurement 1 g bitumen was weighed in a 20 mL capacity transparent glass vial caped with PTFE caps. 5 mL of the solvent to be tested was transferred to the vial, caped, and shaken by hand, with the amount of dissolved bitumen was visually inspected every minute. The time at which the last traces of bitumen disappeared was recorded as the time taken for complete bitumen dissolution. If the entire bitumen sample dissolved, the concentration of the bitumen in the solution may reach 20 wt/vol percent which is a relatively high concentration. The results obtained from these experiments are summarized in Table 1:

TABLE 1

| No | Sample Name | Solubility in Minutes | Remarks |
|---|---|---|---|
| 1 | Pave Pro (Edgecombe County) | 15 | Complete Solubility Generated Appreciable Amount of Foam |
| 2 | HTF-959-B (Wilson County) | 22 | Incomplete Solubility |
| 3 | Orange asphalt Remover (Nash County) | 17 | Complete Solubility |
| 4 | Big Orange E (Edgecombe County) | 22 | Incomplete Solubility |
| 5 | Pure and Natural Orange Bean (Specially Formulated) | 22 | Incomplete Solubility |
| 6 | Invention (IPB) | 12 | Completely Soluble No Foam Was Generated |

The solution employed in the method of the invention (No. 6) is the most efficient solvent for bitumen as it was the fastest to dissolve the 1 g sample in 12 minutes. The Pave Pro solvent (No. 1) dissolved the 1 g of bitumen in 15 minutes. Nonetheless, No. 6 is distinguished from No. 1 by the fact that it doesn't foam when it was shaken. Conversely, No. 1 produced a high foam column when it was shaken. According to the Department of Transportation (DOT) guidelines, it is highly recommended that the solvent does not produce foam as this will potentially decrease its efficiency when it is applied by sprayers. Such a decrease is often experienced when these solvents are used in cleaning asphalt-paving equipment.

Example 18

Bitumen Extraction from Asphalt

An asphalt sample obtained from Texaco Petroleum Company of Houston, Tex. was contacted with a solution of IPB for approximately 15 min. at a temperature of about 25° C. A maximum concentration of 23.71 wt./vol. percent of bitumen in the IPB was achieved. Such a result compared favorably with a 26.40 wt./vol. percent concentration of bitumen in a conventional solution of methylene chloride.

Example 19

Extraction of Bitumen in Carbon Dioxide as a Function of Temperature and Pressure (Single-Batch)

Bitumen was extracted using a carbon dioxide containing fluid, and the effect on fluid temperature and pressure was evaluated. An asphalt sample (5 g) was loaded into a high-pressure 20 mL capacity reactor. The reactor was heated to the desired temperature. The system was pressurized with carbon dioxide at a rate of 10 mL/min until the desired pressure was reached by means of a high-pressure syringe pump. The system was left for 1 hr at the desired temperature and pressure after which carbon dioxide and the extracted bitumen was conveyed under pressure to another reactor supplied with sapphire windows (view-cell) at a rate of 10 mL/min. After the extract was cooled to ambient temperature, the carbon dioxide was slowly discharged from the system at a rate of 1 mL. The system was thereafter opened, the extracted bitumen was collected quantitatively by dissolution in methylene chloride, and subsequently the solvent was evaporated in a vacuum oven at 50° C. for 24 hrs. The mass of extracted bitumen was calculated and the percent extracted was thus obtained. The total bitumen content of asphalt was determined by methylene chloride extraction.

The extractions were each carried out for a one hour residence time. The results of the extraction are set forth in FIG. 10. As exhibited, the amount of extracted bitumen increased as a function of both temperature and pressure.

Example 20

Extraction of Bitumen in Carbon Dioxide as a Function of Temperature and Pressure (Multiple Extractions)

Various asphalt samples were placed in a high-pressure 20 mL capacity reactor. The reactor was heated to the desired temperature and then pressurized with carbon dioxide to the desired pressure at a flow rate of 10 mL/min by means of a high-precision syringe pump. The system was left at 1 hr at the desired temperature and pressure after which $CO_2$ and the extracted bitumen was conveyed under pressure to another reactor supplied with sapphire windows (view-cell) at a rate of 10 mL/min followed by another transfer to a second view cell in the same manner. After cooling the extract to ambient temperature, $CO_2$ was slowly discharged from the system at a rate of 1 mL/min. The system was repressurized in the manner described above, and the process was repeated six times. The residence time for each step was held constant at 15 min. At the end of the sixth extraction, the system was opened and the extracted bitumen was collected from both view cells quantitatively by dissolution in methylene chloride. The solvent was thereafter evaporated in a vacuum oven at 50° C. for 24 hours. The mass of the extracted bitumen was then calculated and the percentage extraction was obtained. The total bitumen content of asphalt was obtained by methylene chloride extraction.

The results of the multiple extraction runs are illustrated in FIG. 11. In general, extraction quantity increased as a function of temperature and pressure. A maximum of 94.96 weight percent of bitumen was extracted at a pressure of 5000 psi and a temperature of 100° C.

Example 21

Extraction with Supercritical Carbon Dioxide

An asphalt paving sample (to the nearest 0.1 mg) is placed in a high-pressure reactor. The reactor is pressurized with $CO_2$ at a pressure ranging from 1000 to 5000 psi and the temperature is adjusted and maintained at the set temperature ranging from 25 to 120° C. The system is left to equilibrate for the appropriate residence time after which the pressurized gas is allowed to pass onto a collecting cooled trap. $CO_2$ is slowly vented from the trap at a flow rate of 1 mL/min leaving the extracted bitumen in the trap which is quantified by weighing the trap before and after extraction. The process may be repeated for 6 times to extract the maximum amount of bitumen.

Example 22

Extraction with the Benzoic Acid Ester Containing Solvent

The residue which is left in the high-pressure reactor after extraction with $CO_2$ according to Example 21 is mixed with the benzoic acid ester containing solvent using a mechanical stirrer mounted over the reactor. The solvent-to-sample ratio ranges from 2:1 to 5:1 volume-to-mass ratio. Although not intending to be bound by theory, it is believed that such a ratio depends on the amount of bitumen present in the sample.

The solvent is added in 4 to 6 aliquots until the solvent venting the system becomes colorless. In a preferred embodiment, the solvent venting the cell is filtered from the inorganic insoluble particles constituting part of the asphalt paving mixture using online filters with 0.2μ pore size. The refractive index of the filtrate is measured by a refractometer until the refractive index of the solvent is exactly the same as that of the pure solvent to insure that bitumen is fully extracted from the sample.

Example 23

Precipitating Bitumen from the Benzoic Acid Ester Containing Solvent

The solution of bitumen in the benzoic acid ester containing solvent obtained according to Example 22 is placed in a high-pressure reactor supplied with a sapphire view cell. The system is pressurized with a $CO_2$ specific pressure (1000-5000 psi), temperature (25-120° C.), and residence time (5-120 min) that will efficiently precipitate the bitumen, preferably all of the bitumen. $CO_2$, plus the dissolved benzoic acid ester containing solvent is allowed to vent from the system to a collecting vessel at a flow rate of 1 mL/min. The system is washed several times with $CO_2$ to solubilize the benzoic acid ester containing solvent and the residue is dried under vacuum and quantified. $CO_2$ is separated from the benzoate solvent by depressurizing and cooling the system. The total extracted bitumen is quantified as the sum of the bitumen extracted from $CO_2$ and that extracted by the benzoic acid ester containing solvent.

Example 24

Analytical Determination of Bitumen in Asphalt Sample

An asphalt paving mixture sample weighed to the nearest 0.1 mg is placed in the extraction thimble of a soxhlet extractor apparatus. The benzoic acid ester-containing solvent is heated to boiling and the condensed liquid extracts the bitumen from the asphalt paving mixture sample. The process is stopped when the solvent dripping from the extraction thimble is rendered colorless. The inorganic material left in the extraction thimble is then rinsed several times with ethanol, dried until constant mass, and weighed to the nearest 0.1 mg. The mass of the extracted bitumen is obtained by subtracting the mass of the residual inorganics from the mass of the asphalt sample determined before the extraction step.

Example 25

Analytical Determination of Bitumen in Asphalt Sample

The procedure according to Example 16 is repeated except that an asphalt paving mixture is placed in a Buchner funnel, rinsed with a benzoic acid ester-containing solvent until the solvent is rendered colorless. The benzoic acid ester-containing solvent containing the extracted bitumen is subjected to a carbon dioxide-containing fluid for precipitating the bitumen and recycling the solvent.

Example 26

Benzoic Acid Ester Miscibility Study $CO_2$ was found to be miscible with isopropyl benzoate at the following conditions: 1:1, 1:2, 1:3, 1:4, 1:5, 2:1, 3:1, 4:1, and 5:1, $CO_2$: isopropyl benzoate vol.:vol. ratios, at the following temperatures: 25, 35, 45, and 60° C., and at the following pressures: 500, 1000, 1500, 2000, 2500, 3000, 3500, 4000, 4500, and 5000 psi, as determined using known procedures.

Example 27

Analytical Determination of Bitumen in Large Asphalt Sample

An asphalt paving mixture sample weighed to the nearest 0.1 mg is placed in the Ploog Engineering Co. Centrifuge apparatus. The benzoic acid ester-containing solvent is heated to boiling and the condensed liquid is run through the centrifuge and extracts the bitumen from the asphalt paving mixture sample. The process is stopped when the solvent dripping from the centrifuge is rendered colorless. The inorganic material left in the centrifuge is then rinsed several times with ethanol, dried until constant mass, and weighed to the nearest 0.1 mg. The mass of the extracted bitumen is obtained by subtracting the mass of the residual inorganics from the mass of the asphalt sample determined before the extraction step.

Example 28

Bitumen Extraction from Asphalt

An asphalt sample was contacted with a solution of isopropyl salicylate for approximately 15 min. at a temperature of about 25° C. A maximum concentration of 23.71 wt./vol. percent of bitumen in the isopropyl salicylate was achieved. Such a result compared favorably with a 26.40 wt./vol. percent concentration of bitumen in a conventional solution of methylene chloride.

Example 29

Extraction with Supercritical Carbon Dioxide

An asphalt paving sample (to the nearest 0.1 mg) is placed in a high-pressure reactor. The reactor is pressurized with $CO_2$ at a pressure ranging from 1000 to 5000 psi and the temperature is adjusted and maintained at the set temperature ranging from 25 to 120° C. The system is left to equilibrate for the appropriate residence time after which the pressurized gas is allowed to pass onto a collecting cooled trap. $CO_2$ is slowly vented from the trap at a flow rate of 1 mL/min leaving the extracted bitumen in the trap which is quantified by weighing the trap before and after extraction. The process may be repeated for 6 times to extract the maximum amount of bitumen.

Example 30

Extraction with the Ester-Containing Solvent

The residue which is left in the high-pressure reactor after extraction with $CO_2$ according to Example 29 is mixed with the ester-containing solvent using a mechanical stirrer mounted over the reactor. The solvent-to-sample ratio ranges from 2:1 to 5:1 volume-to-mass ratio. Although not intending to be bound by theory, it is believed that such a ratio depends on the amount of bitumen present in the sample.

The solvent is added in 4 to 6 aliquots until the solvent venting the system becomes colorless. The solvent venting the system is filtered from the inorganic insoluble particles constituting part of the asphalt paving mixture using online filters with 0.2 μm pore size. The refractive index of the filtrate is measured by a refractometer until the refractive index of the solvent is exactly the same as that of the pure solvent to insure that bitumen is fully extracted from the sample.

Example 31

Precipitating Bitumen from the Ester-Containing Solvent

The solution of bitumen in the ester-containing solvent obtained according to Example 30 is placed in a high-pressure reactor supplied with a sapphire view cell. The system is pressurized with a $CO_2$ specific pressure (1000-5000 psi), temperature (25-120° C.), and residence time (5-120 min) that will efficiently precipitate the bitumen, preferably all of the bitumen. $CO_2$, plus the dissolved ester-containing solvent is allowed to vent from the system to a collecting vessel at a flow rate of 1 mL/min. The system is washed several times with $CO_2$ to solubilize the ester-containing solvent and the residue is dried under vacuum and quantified. $CO_2$ is separated from the solvent by depressurizing and cooling the system. The total extracted bitumen is quantified as the sum of the bitumen extracted from $CO_2$ and that extracted by the ester-containing solvent.

Example 32

Analytical Determination of Bitumen in Asphalt Sample

An asphalt paving mixture sample weighed to the nearest 0.1 mg is placed in the extraction thimble of a soxhlet extractor apparatus. The ester-containing solvent is heated to boiling and the condensed liquid extracts the bitumen from the asphalt paving mixture sample. The process is stopped when the solvent dripping from the extraction thimble is rendered colorless. The inorganic material left in the extraction thimble is then rinsed several times with ethanol, dried until constant mass, and weighed to the nearest 0.1 mg. The mass of the extracted bitumen is obtained by subtracting the mass of the residual inorganics from the mass of the asphalt sample determined before the extraction step.

Example 33

Analytical Determination of Bitumen in Asphalt Sample

The procedure according to Example 32 is repeated except that an asphalt paving mixture is placed in a Buchner funnel, rinsed with an ester-containing solvent until the solvent is rendered colorless. The ester-containing solvent containing the extracted bitumen is subjected to a carbon dioxide-containing fluid for precipitating the bitumen and recycling the solvent.

Example 34

Solubility Study of Ester-Containing Solvent in Carbon Dioxide

The miscibility of $CO_2$ with isopropyl salicylate was evaluated. $CO_2$ was found to be miscible with isopropyl salicylate at the following conditions: 1:1, 1:2, 1:3, 1:4, 1:5, 2:1, 3:1, 4:1, and 5:1, $CO_2$: isopropyl salicylate vol.:vol. ratios, at the following temperatures: 25, 35, 45, and 60° C., and at the following pressures: 500, 1000, 1500, 2000, 2500, 3000, 3500, 4000, 4500, and 5000 psi.

Having thus described certain preferred embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. A method for determining the percent of bitumen present in a petroleum residue sample containing bitumen and inorganic material, said method comprising:
    (a) weighing the petroleum residue sample;
    (b) contacting the petroleum residue sample with an ester-containing solvent to remove substantially all of the bitumen therefrom;
    (c) weighing the inorganic material remaining in the sample;
    (d) determining the percentage of bitumen in the sample based on the results of steps (a) and (c); and
    (e) removing the ester-containing solvent after the contacting step.

2. The method according to claim 1, wherein the inorganic material remains subsequent to said step of contacting the petroleum residue sample with an ester-containing solvent, said method further comprising contacting the inorganic material at least once with an organic solvent.

3. The method according to claim 2 wherein the organic solvent is a C1-C4 alcohol.

4. The method according to claim 3 wherein the organic solvent is ethanol.

5. The method according to claim 1 wherein the petroleum residue is an asphalt residue.

6. The method according to claim 1, further comprising the step of contacting the ester containing solvent with a fluid comprising carbon dioxide, wherein the petroleum residue is recovered in the fluid such that the ester-containing solvent is separated from the petroleum residue.

* * * * *